Figure 1:
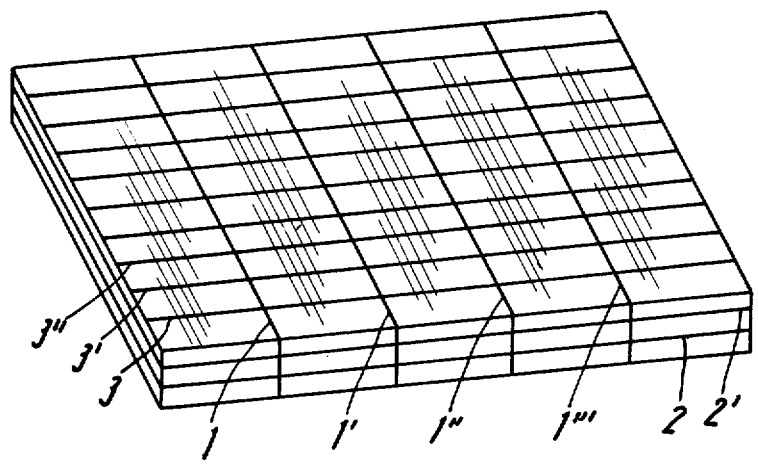

United States Patent [19]

Nienstedt

[11] 3,927,592

[45] Dec. 23, 1975

[54] APPARATUS FOR SAWING UP FLAT, RECTANGULAR BLOCKS, IN PARTICULAR DEEP-FROZEN BLOCKS OF FISH

[76] Inventor: Heinz Nienstedt, Zum Nonnenberg 8a, 435 Recklinghausen, Germany

[22] Filed: Jan. 30, 1974

[21] Appl. No.: 437,956

[30] Foreign Application Priority Data
Feb. 9, 1973 Germany............................ 2306343

[52] U.S. Cl. .................. 83/404.2; 83/408; 83/419; 83/714
[51] Int. Cl.² ........................ B26D 5/00; B26D 4/00
[58] Field of Search............. 883/404.1, 404.2, 408, 883/704, 705, 706, 714, 419

[56] References Cited
UNITED STATES PATENTS

| | | | |
|---|---|---|---|
| 2,103,567 | 12/1937 | Van Berkel........................ | 83/419 X |
| 3,224,307 | 12/1965 | Kinker.............................. | 83/408 X |
| 3,491,816 | 1/1970 | Harrison........................... | 83/305 |
| 3,738,258 | 6/1973 | Goodale............................ | 83/419 X |

Primary Examiner—Willie G. Abercrombie
Attorney, Agent, or Firm—Waters, Schwartz & Nissen

[57] ABSTRACT

An apparatus including an indented block saw which divides blocks into bars by means of individual consecutive cuts, the bars then being carried one after the other on the transport device to the slab saw, with the provision of a change-over table divided into three parts in the direction of conveyance, whose front and back parts can be moved into a position outside the transport path of the middle part and in the transport path of the saw table, and then back into the transport path of the middle part, the table having a buffer guide set to conform to the width of the bar which is to be sawn off, and wherein the first transport device is joined to the front part of the change-over table which moves in the transport path of the saw table, while a turning and slab separating device is located between the slab saw and the stick saw.

4 Claims, 8 Drawing Figures

APPARATUS FOR SAWING UP FLAT, RECTANGULAR BLOCKS, IN PARTICULAR DEEP-FROZEN BLOCKS OF FISH

The invention relates to an apparatus for sawing up flat, rectangular blocks, in particular, deep-frozen blocks of fish, into rectangular sticks, consisting of several saws which divide the blocks into smaller and smaller rectangular units by vertical to inclined cuts, transport devices between the individual saws for the smaller units, a block sawing device with a saw table which is provided with transport devices for moving the blocks during cutting, a slab saw which divides the smaller units coming from the block saw into even smaller units, a stick saw which divides the units coming from the slab saw into sticks, and an apparatus placed after the block saw for turning over and separating the slabs, from which the slabs can be carried along their sides by means of one of the transport devices to further saws.

In a known apparatus of this type, such as U.S. Pat. No. 3,491,816, the block saw has several parallel saw bands which concurrently divide the block into several slabs of the same thickness. These slabs pass in a pile over a turning and separating apparatus to the slab saw, the latter of which also has several parallel cutters, and which concurrently divide a slab into several narrow strips. These narrow strips then pass to the stick saw, which cuts them off to the desired length. With this known device it is possible to make sticks from blocks without an operator having to touch the objects which have to be divided a number of times. From the point of view of hygiene there are no problems with cutting on this apparatus. It is however a disadvantage that, when dividing the block several cuts are made at the same time, since this necessitates use of a complicated bandsaw. Every band requires its own drive and a number of small guide rollers. The large number of these movable parts for the guides and drives is a source for breakdowns and, moreover, they are difficult to clean. Access for simple cleaning is important for the utilisation of such an apparatus.

The object of the invention is to provide an apparatus of the above type, which is of simpler construction while keeping the advantage that blocks can be divided into sticks without manual intervention by operators.

The invention attains this object in that an indented block saw divides the blocks into bars by means of individual consecutive cuts, the bars then being carried one after the other on the transport device to the slab saw, with the provision of a change-over table divided into three parts in the direction of conveyance, whose front and back parts can be moved into a position outside the transport path of the middle part and in the transport path of the saw table, and then back into the path of the middle part, the transport table having a buffer guide set to conform to the width of the bar which is to be sawn off, and wherein the first transport device is joined to the front part of the change-over table which moves in the transport path of of the saw table, while a turning and slab separating device is located between the slab saw and the stick saw. By means of such an apparatus construction it is possible to readily divide slabs into sticks. Since only one single-edged saw is used, in particular a band saw, a simple drive and a simple guide can be used, whereby cleaning becomes easy. Although only one single-edged saw is provided, the repeated feeding is fully automatically effected.

Figure 2:
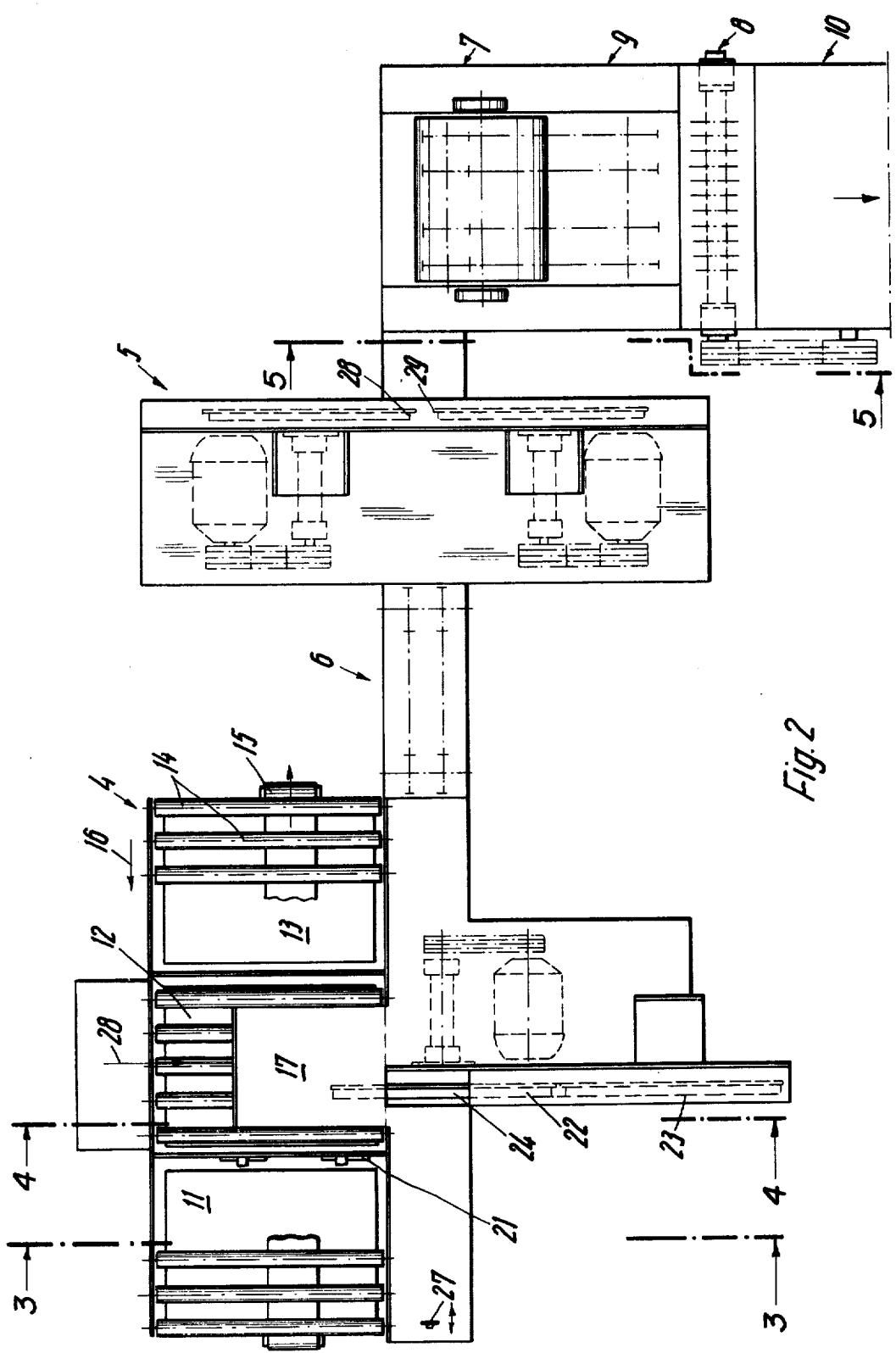
Figure 3:
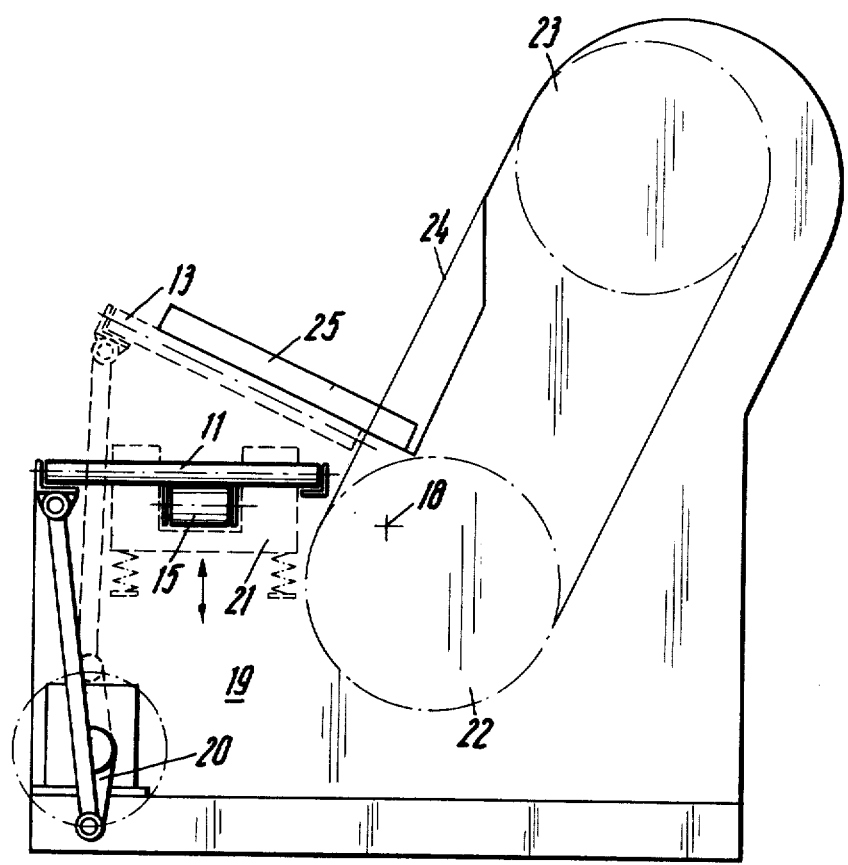
Figure 4:
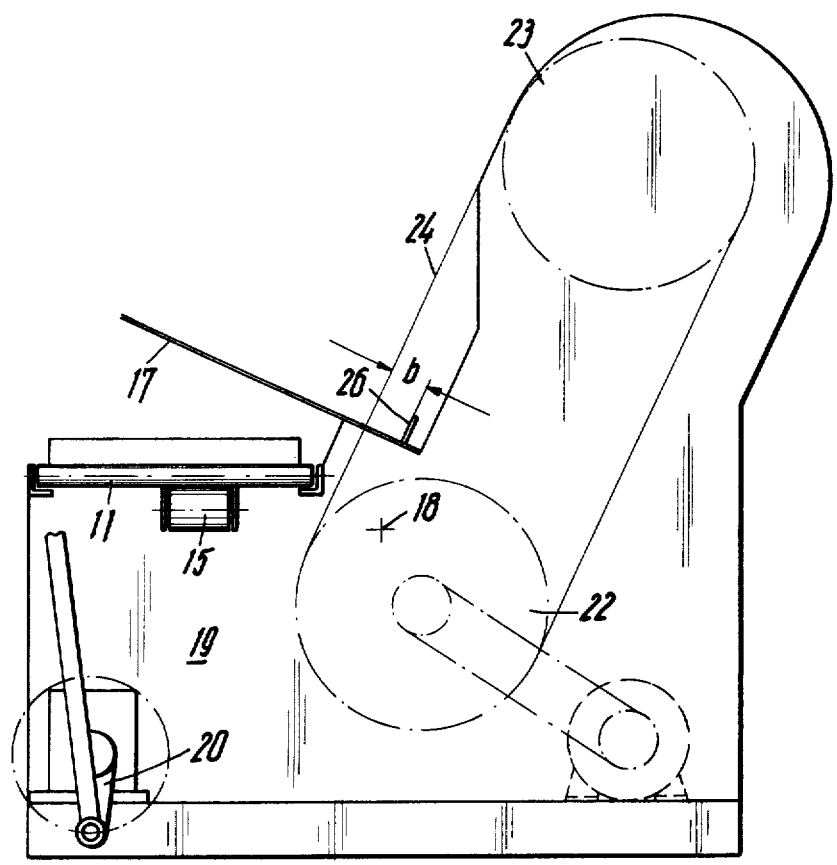
Figure 5:
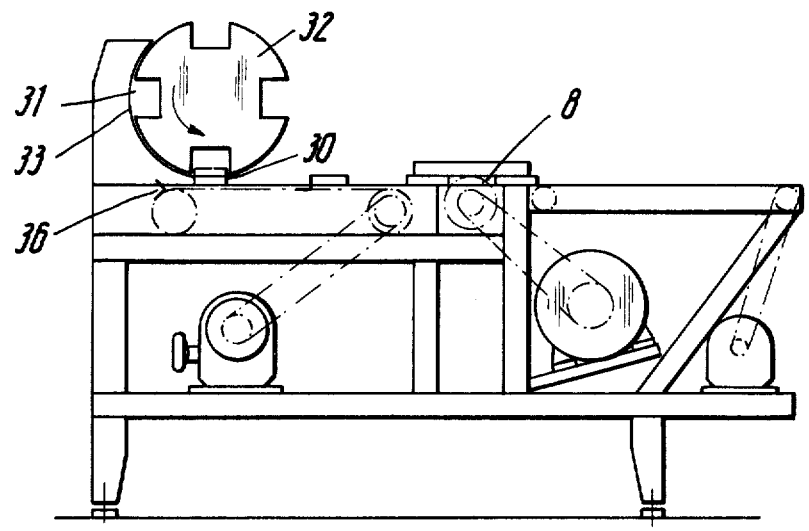
Figure 6:
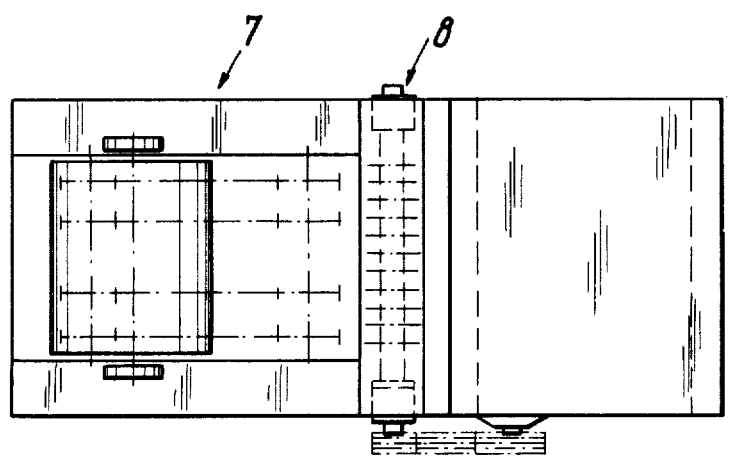
Figure 7:
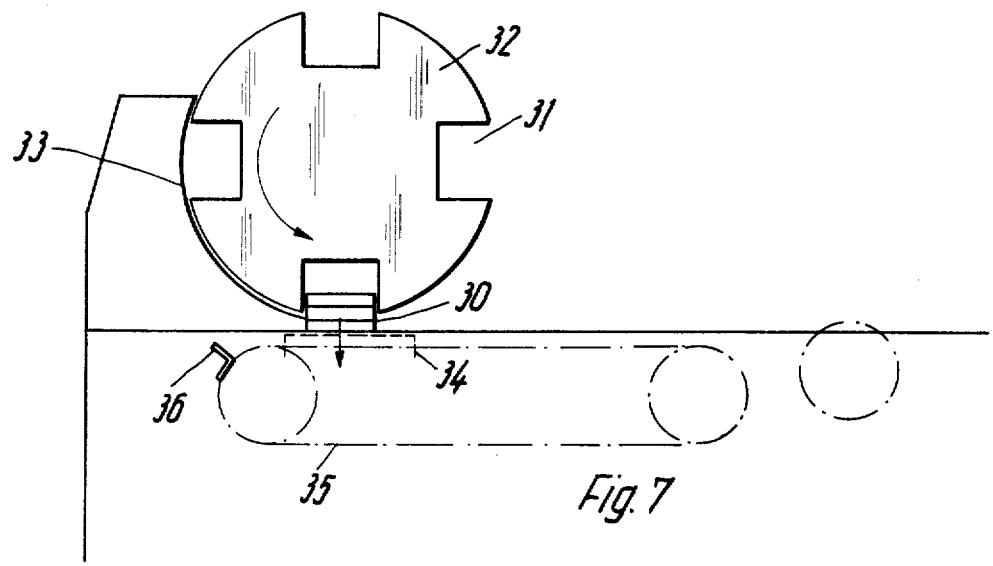
Figure 8:
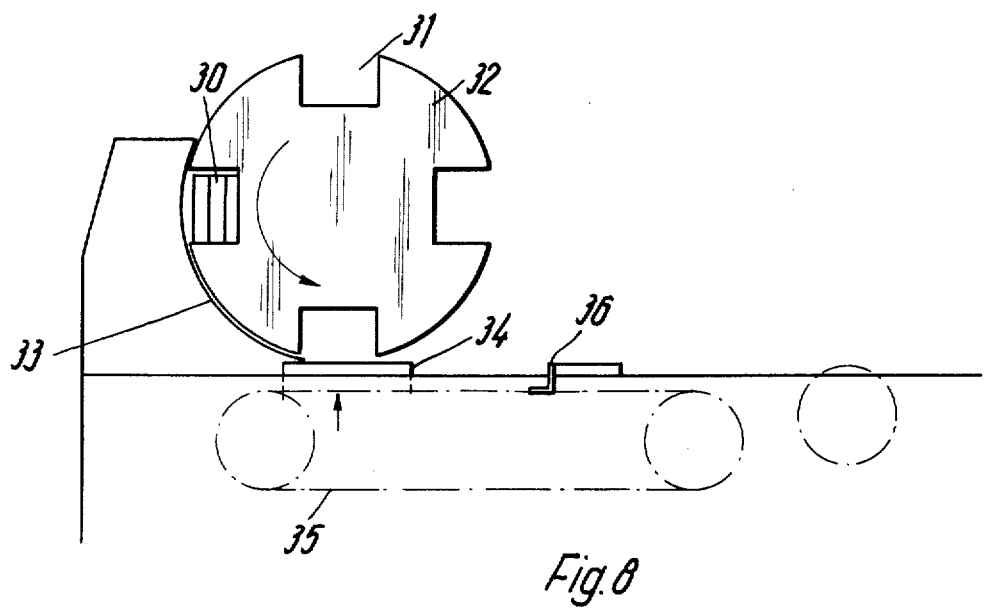

In the following the invention is described in more detail with reference to the accompanying drawings showing an embodiment; in which:

FIG. 1 shows a perspective view of a block,
FIG. 2 shows a plan view of the apparatus for sawing,
FIG. 3 shows a section of the apparatus in FIG. 2 taken along line 3—3,
FIG. 4 shows a section of the apparatus in FIG. 2 taken along line 4—4,
FIG. 5 shows a side view of part of the apparatus in FIG. 2 taken along line 5—5,
FIG. 6 shows the part of the apparatus in FIG. 5 in a top view,
FIG. 7 shows an enlarged side view of a section of the part of the apparatus shown in FIG. 5,
FIG. 8 shows the section in FIG. 7 in another operating condition.

The block shown in FIG. 1 is first divided by cuts 1, 1', 1'', 1''' into bars located on the apparatus. The individual bars are then divided into slabs by the cuts 2, 2'. The individual slabs are then divided into numerous sticks, which are the smallest unit, by cuts 3, 3', 3''.

The apparatus of a block saw 4, a first transport way 6 leading from the block saw 4 to a slab saw 5, a turning apparatus 7 after the slab saw 5, a second transport way 9 extending at right angles from the turning apparatus 7 and leading to a stick saw 8, and a third transport way 10 leading away from the stick saw 8.

The block saw has a change-over table consisting of three relatively moveable parts 11, 12, 13, which is set with a number of loose rollers 14 in frames extending in parallel to one another. Under the change-over table there is located a driven band 15 which runs in the transporting direction, and which moves the rollers 14 of the change-over table by contact when they are in the horizontal position. The transport device of the change-over table is indicated by the numeral 16. Above the middle part 12 of the change-over table there is located an inclined saw table 17. The back and front part 11, 13 of the change-over table can be tilted from the horizontal position into the inclined position of the saw table 17 about an axle 18 which turns in the transport direction, so that the back and front part 11, 13 of the change-over table alternately form a common plane with the saw table 17. In order to tilt the back and front part 11, 13 of the change-over table there are provided lifting devices 20 which are supported against the base 19 and engage on the back and front part 11, 13, and which are in the form of crank gears. Thus, when the back part 11 of the change-over table is lifted, a block 25 which is carried back by the rollers 14 of the change-over table does not run under the lifted back part 11, as there is provided a spring-loaded barrier 21 on the back edge of the middle part 12 which, by lowering the back part 11 of the change-over table can be lowered out of the transport path of the change-over table. Within the base 19 there are positioned guide rollers 22, 23 for a saw band 24, the latter of which runs vertical to the plane of the saw table 17. For the block 25 which is to be sawed into individual bars, the base has a buffer guide 26 which can be set to the width $b$ of the bar which is to be sawn off, and against which the block 25 rests during sawing because of its inclined position and due to its own weight. In order to push the block 25 forwardly, a reversible running driver 27 is located between the guide buffer 23 and the back part 11 of the change-over table.

Sawing off individual bars from the block 25 carried out in the following manner: the block 25 conveyed in the direction of the arrow 28 onto the change-over table 11, 12, 13 is carried by the rollers 14, the latter of which are in contact with the band 15 because of this horizontal position and are thus driven in the direction of the arrow 16 to the back part 11 of the change-over table. As soon as it reaches this position, the lifting devices 20 of the back part 11 are activated and the back part 11, together with the block 25, is tilted into the position shown in FIG. 3 for the front part 13. In this position the block 22 slips against the buffer guide 26. It is taken up by the driver 27 and pushed forward towards the saw blade 24, and a bar is separated therefrom. The front part 13 of the change-over table is also tilted up by the corresponding lifting devices 20, so as to take the block 25 which is pushed forwardly during sawing. After the block 25 has left the saw table 17 the front part 13 of the change-over table is lowered so that its rollers 14 can once again come into contact with the band 15. The block 25 is then carried backwards, at first up to the barrier 21 which projects into the transport path, and after the barrier 21 is lowered, onto the back part 11 of of the change-over table which, in the interim, been lowered again, so that when the back part 11 is again tilted up it can be carried again to the saw for cutting off the subsequent bar. The sawn off bars are pushed onto the transport path 6 and carried therealong to the slab saw 5.

The slab saw 5 has several band saw, whose band 28, 29 are located in parallel to one another and are arranged side, by side or one behind the other, and are adopted to divide the bars by means of vertical cuts into individual slabs. From the slab saw 5 the piles of slabs 30 pass into lengthwise grooves 31 which are formed in a turning cross 32. The turning cross 32 has a stepping mechanism, which turns it through 90° increments. In the take-up position, the lengthwise groove 31 comes into alignment with the approaching pile of slabs 30 (FIG. 8). The turning cross 32 is covered by a deflector 33 extending from the back edge of the lengthwise groove 31 in its take-up position (FIG. 8) to the back edge of the lengthwise groove 31 in the separating position (FIG. 7), i.e. in the position turned through 90°, the deflector holding the pile of slabs 30 in the lengthwise groove 31 during turning. Under the lengthwise groove 31, in its separating position there is a table 34 which can be lowered by a thickness of a slab, and in the raised position it forms a continuation of the deflector 33 to the front edge of the lengthwise groove 31. During turning the table 34 is lifted, so that the pile of slabs 30 stays in the lengthwise groove 31 until the end of the turning process. The table 34 is then lowered by the thickness of a slab so that the individual slabs are taken along by the driver 36 which is fastened to a band 35 and fed individually to the stick saw 8, the latter of which consists of a number of parallel saw blades located next to one another.

I claim:

1. An apparatus for sawing up flat, rectangular blocks into rectangular sticks, consisting of several saws which divide the blocks into smaller and smaller rectangular units by vertical cuts, and transport devices between the individual saws for the smaller units, an indented block saw having a saw table; transport devices on said saw table for transporting the blocks during cutting, a slab saw for concurrently dividing the smaller units coming from the block saw into even smaller units; a stick saw for dividing the units coming from the slab saw into sticks, and an apparatus placed after the block saw for turning over and separating the slabs, from which the slabs are carried on their sides by means of one of the transport devices to the later saws, characterized in that the indented block saw (4) dividing the blocks (25) into individual bars with individual consecutive cuts, the said transport device (6) sequentially conveying the bars to the slab saw (5), said one transport device having a change-over table divided into three parts in the direction of transporting including front, middle and back parts; means for moving the front and the back parts (13, 11) into a position outside the transport path of the middle part (12) and into the transport path of the saw table (17) and back into the transport path of the middle part (12) for repeatedly carrying the blocks (25) on the saw table (17) for them to be divided into bars, a buffer guide 26 being mounted on the middle part (12) of the saw table, said buffer guide/being set to the width of the bar to be sawn off, and the one transport device (6) being fastened to the front part (13) of the change-over table which is movable in the transport path of the saw table (17), and the turning and slab separating apparatus (30, 7) being positioned between the slab saw (5) and the stick saw (8).

2. An apparatus as in claim 1, characterised in that the saw table (17) is inclined above the change-over table (11, 12, 13), and means for tilting the front and the back parts (13, 11) of the change-over table about an axle (18) running in the transport direction.

3. An apparatus as in claim 1, characterised in that the transport means of the change-over table comprise rollers (14); a frame rotatably supporting said rollers, a band (15) in the plane of the middle part (12) for driving said rollers, the band being located below the change-over table.

4. An apparatus as in claim 1, characterised in that the turning and separating apparatus is in the form of a rotating turning cross (32) turnable through 90° increments, which on its perimeter has four open grooves (31) displaced at 90° to one another and being parallel to the turning axis, a deflector (33) covering the grooves from their back edges in the take-up position for the pile of slabs to just before the front edges of the groove in the separating position.

* * * * *